United States Patent
Jung et al.

(10) Patent No.: US 9,500,799 B2
(45) Date of Patent: Nov. 22, 2016

(54) BACKLIGHT ASSEMBLY AND LIQUID CRYSTAL DISPLAY

(71) Applicant: SAMSUNG ELECTRONICS CO., LTD., Suwon-si (KR)

(72) Inventors: Sung Soo Jung, Suwon-si (KR); Eun Serb An, Yongin-si (KR); Hyun Jun Jung, Suwon-si (KR); Dae Hyoun Byoun, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/577,200

(22) Filed: Dec. 19, 2014

(65) Prior Publication Data
US 2015/0103559 A1   Apr. 16, 2015

Related U.S. Application Data

(63) Continuation of application No. 12/639,100, filed on Dec. 16, 2009, now Pat. No. 8,947,617.

(30) Foreign Application Priority Data

Apr. 27, 2009   (KR) .......................... 10-2009-0036719
Aug. 31, 2009   (KR) .......................... 10-2009-0081639

(51) Int. Cl.
*G02F 1/1335* (2006.01)
*F21V 8/00* (2006.01)

(52) U.S. Cl.
CPC ........... *G02B 6/0083* (2013.01); *G02B 6/0073* (2013.01); *G02F 1/1336* (2013.01); *G02F 1/133608* (2013.01); *G02F 1/133615* (2013.01)

(58) Field of Classification Search
CPC ........ G09F 13/16; G09F 13/18; G09F 23/06; G09F 2013/222; G09F 2013/1845; G09F 2013/1881; G09F 2013/1831; G09F 13/04; G02F 1/133615; G02F 1/133608; G02F 1/13357
USPC ...................................... 349/61–71
See application file for complete search history.

(56) References Cited

U.S. PATENT DOCUMENTS 5,931,555 A     8/1999  Akahane et al.
7,106,393 B2 *  9/2006  Lee ................................. 349/58
(Continued)

FOREIGN PATENT DOCUMENTS

KR      20040063385       7/2004
KR      20040105178       12/2004

OTHER PUBLICATIONS

U.S. Restriction Requirement Action mailed Feb. 21, 2012 in copending U.S. Appl. No. 12/639,100.
(Continued)

*Primary Examiner* — Hoan C Nguyen
(74) *Attorney, Agent, or Firm* — Staas & Halsey LLP (57) ABSTRACT

Disclosed herein are a backlight assembly and a liquid crystal display (LCD) having the same, wherein the backlight assembly includes a light guide panel having a plurality of lateral sides; and a plurality of light source units each emitting light to a respective lateral side of the plurality of lateral sides, wherein at least two lateral sides of the plurality of lateral sides, which receive light emitted from two respective light source units of the plurality of light source units, are neighboring lateral sides, and wherein at least one lateral side is longer than an incident surface which receives light emitted from the light source unit.

9 Claims, 11 Drawing Sheets (56) References Cited

U.S. PATENT DOCUMENTS

| | | |
|---|---|---|
| 7,304,695 B2 * | 12/2007 | Park .............................. 349/65 |
| 7,942,542 B1 | 5/2011 | Dunn |
| 8,100,573 B2 * | 1/2012 | Kim et al. ................... 362/612 |
| 2002/0140880 A1 | 10/2002 | Weindorf et al. |
| 2003/0043314 A1 | 3/2003 | Lee et al. |
| 2003/0218702 A1 | 11/2003 | Kwon et al. |
| 2005/0036069 A1 | 2/2005 | Lee et al. |
| 2006/0007708 A1 | 1/2006 | Lee |
| 2006/0028836 A1 | 2/2006 | Shin et al. |
| 2006/0109688 A1 | 5/2006 | Oosawa |
| 2007/0109461 A1 | 5/2007 | Park |
| 2007/0115693 A1 | 5/2007 | Shu |
| 2007/0223253 A1 | 9/2007 | Sakai et al. |
| 2008/0175023 A1 | 7/2008 | Lee et al. |
| 2009/0097277 A1 | 4/2009 | Iwasaki |
| 2010/0165233 A1 | 7/2010 | Jung |
| 2010/0165253 A1 | 7/2010 | Jung et al. |
| 2010/0195014 A1 * | 8/2010 | Arihara .......................... 349/58 |

OTHER PUBLICATIONS

U.S. Office Action mailed Apr. 10, 2012 in copending U.S. Appl. No. 12/639,100.

U.S. Final Office Action mailed Sep. 20, 2012 in copending U.S. Appl. No. 12/639,100.

U.S. Office Action mailed Nov. 14, 2013 in copending U.S. Appl. No. 12/639,100.

U.S. Final Office Action mailed Mar. 10, 2014 in copending U.S. Appl. No. 12/639,100.

U.S. Final Office Action mailed Jul. 24, 2014 in copending U.S. Appl. No. 12/639,100.

U.S. Notice of Allowance mailed Sep. 22, 2014 in copending U.S. Appl. No. 12/639,100.

U.S. Appl. No. 12/639,100, filed Dec. 16, 2009, Sung Soo Jung et al., Samsung Electronics Co., Ltd.

* cited by examiner

BACKLIGHT ASSEMBLY AND LIQUID CRYSTAL DISPLAY

CROSS-REFERENCE TO RELATED APPLICATIONS

This application is a continuation application of U.S. patent application Ser. No. 12/639,100, filed Dec. 16, 2009, and is related to and claims the priority benefit of Korean Patent Application No. 10-2009-36719, filed on Apr. 27, 2009, in the Korean Intellectual Property Office, and Korean Patent Application No. 10-2009-81639, filed Aug. 31, 2009, in the Korean Intellectual Property Office, the disclosures of which are incorporated herein by reference

BACKGROUND

1. Field of the Invention

Exemplary embodiments of the present invention relate to a backlight assembly improved to support a light guide panel from being thermally deformed by heat generated from a light source unit and minimize overlapping of lights from the light source unit at a corner of the light guide panel, and a liquid crystal display (LCD) including the same.

2. Description of the Related Art

Generally, a liquid crystal display (LCD) displays an image utilizing electric and optical properties of liquid crystal. The LCD has been widely used in industrial fields since being relatively thin and light compared to other display devices while consuming less power and operating with a low driving voltage.

Such an LCD comprises an LCD panel constituted by injecting a liquid crystal between two hermetically sealed transparent substrates, and a backlight assembly that supplies light to the LCD panel. Being applied with a voltage, the LCD panel changes the alignment direction of liquid crystal molecules, thereby varying its optical transmittance and accordingly optically displaying an image.

A light source of the backlight assembly may comprise a cold cathode fluorescent lamp (CCFL), an external electrode fluorescent lamp (EEFL), and a flat fluorescent lamp (FFL). However, the CCFL is inadequate for a refined look of the product and limited in achieving lightness and compactness of the product. Therefore, recently, a light emitting diode (LED) having improved brightness, lifespan, and color purity is more frequently used for the light source. Moreover, whereas use of the CCFL has been decreasing as Restriction of the use of Hazardous Substances (RoHS) is reinforced, the trend is to use the LED made of environment-friendly materials.

The backlight assembly using the LED light source may be classified largely into a direct type and an edge-lighting type according to the structural factors including the arrangement of LEDs and the shape of a light guide panel. The direct-type backlight assembly is difficult to have a slim form since LEDs are arranged on a front side of the backlight assembly. In addition, a number of the LEDs required in the direct-type backlight assembly increase the cost.

On the other hand, the edge-lighting LED backlight assembly has LEDs mounted on both sides thereof and draws light through a light guide panel. Therefore, in comparison with the direct type backlight assembly, the edge-lighting type backlight assembly may have a smaller thickness, thereby achieving slimness of the product.

The light guide panel of the edge-lighting type backlight assembly may thermally expand and contract in the area direction. Accordingly, it is important to prevent the light guide panel from being damaged by the thermal deformation.

In addition, in the edge-lighting type backlight assembly, lights from the plurality of LEDs arranged on the both sides may overlap around corners of the light guide panel, thereby deteriorating uniformity of brightness and increasing the temperature at the corners.

SUMMARY

Therefore, it is an aspect of the present invention to provide a backlight assembly improved to restrain lights emitted from a light source unit from overlapping around corners of a light guide panel, and a liquid crystal display (LCD) including the same.

It is another aspect of the present invention to provide a backlight assembly to minimize damage of the light guide panel by supporting the light guide panel being deformed by heat generated from the light source, and an LCD including the same.

Additional aspects of the invention will be set forth in part in the description which follows and, in part, will be obvious from the description, or may be learned by practice of the invention.

In accordance with one aspect of the present invention, a backlight assembly includes a light guide panel having lateral sides, and a plurality of light source units each emitting light to at least two neighboring lateral sides of the light guide panel, wherein at least one of the lateral sides of the light guide panel is formed longer than an incident surface which receives light emitted from the light source unit.

The light guide panel may include stepped portions disposed at the corners covering respectively two neighboring lateral sides.

The light source units may be arranged along four sides of the light guide panel, and the stepped parts are formed at the four corners of the light guide panel.

Each of the stepped parts may have depth and width by which the lateral sides of the light guide panel are inwardly cut out.

The lateral sides of the light guide panel may include two long sides and two short sides, and the stepped parts may include first stepped parts cut inwardly by the depth and the width from the short sides of the light guide panel, and second stepped parts cut inwardly by the depth and the width from the long sides of the light guide panel and connectively extended to the first stepped parts.

Any one of the first and the second stepped parts may have a greater width than the other, such that lights emitted from the light source units are not overlapped at corners of the light guide panel.

Any one of the first and the second stepped parts may have smaller depth and width than the other, so as to cover deformation of the light guide panel caused by thermal expansion.

The light source units may each include a light emitting diode (LED) and a circuit board applying electric signals to the LED.

The lateral sides of the light guide panel may include a long side and a short side, and the stepped parts may be formed at corners of one of the long side and the short side.

The lateral sides of the light guide panel may include a long side and a short side, and the stepped parts may be formed at corners of one of the long side and the short side and at non-corner parts of the other one of the lateral sides of the light guide panel.

The backlight assembly may further include a connector electrically connected with the light source unit, and the connector may be inserted in a space defined by the stepped part.

In accordance with another aspect of the present invention, a backlight assembly including a light guide panel including a first surface and a second surface, a first light source unit emitting light to the first surface, and a second light source unit emitting light to the second surface, wherein the first surface of the light guide panel includes a first area facing the first light source unit to receive the light from the first light source, and a second area extended outward from the first area and disposed adjacent to the second surface of the light guide panel.

The second surface of the light guide panel may include a first area facing the second light source unit to receive the light from the second light source, and a second area extended outward from the first area of the second surface and disposed adjacent to the first surface of the light guide panel.

The first surface of the light guide panel may be shorter than the second surface of the light guide panel.

The second area of the first surface and the second area of the second surface may each have a stepped part stepped inward from the light guide panel.

The second area of the first surface may be longer than the second area of the second surface.

In accordance with another aspect of the present invention, a liquid crystal display (LCD) includes a liquid crystal panel that displays images, and a backlight assembly that supplies light to the liquid crystal panel, the backlight assembly including a light guide panel having at least one cut part, a plurality of light source units arranged along lateral sides of the light guide panel, a lower cover having at least one supporting part corresponding to the cut part of the light guide panel, and at least one stepped part disposed at a lateral corner of the light guide panel, being extended from borders with incident surfaces facing the light source units.

The cut part may include first cut parts and second cut parts formed at long sides and short sides of the light guide panel, respectively, and the supporting part may include first supporting parts and second supporting parts fitted with the first cut parts and the second cut parts, respectively.

The light guide panel may further include sub-cut parts disposed substantially in the middle of the whole lengths of the first and the second cut parts, and the lower cover includes sub-supporting parts correspondingly fitted with the sub-cut parts.

The light guide panel may further include a reflection sheet having a cut part for connection with the lower cover.

The stepped parts may include first stepped parts cut inwardly by predetermined depth and width from the short sides of the light guide panel, and second stepped parts cut inwardly by predetermined depth and width from the long sides of the light guide panel and connectively extended to the first stepped parts.

The reflection sheet may be partially cut to have a stepped area corresponding to the position of the stepped part.

The lateral sides of the light guide panel may include a long side and a short side, and the stepped parts may be formed at corners of one of the long side and the short side.

The lateral sides of the light guide panel may include a long side and a short side, and the stepped parts may be formed at corners of one of the long side and the short side and at non-corner parts of the other one of the lateral sides of the light guide panel.

The backlight assembly may further include a connector electrically connected with the light source unit, and the connector may be inserted in a space defined by the stepped part.

In accordance with a further aspect of the present invention, a display device includes a signal processing unit processing image signals and audio signals received from the outside, a liquid crystal panel displaying the image signals supplied from the signal processing unit, and a backlight assembly supplying light to the liquid crystal panel, wherein the backlight assembly comprises a light guide panel having at least one cut part, a plurality of light source units arranged along lateral sides of the light guide panel, a lower cover having at least one supporting part corresponding to the cut part of the light guide panel, and at least one stepped part disposed at a lateral corner of the light guide panel, being extended from borders with incident surfaces facing the light source units.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION OF THE EMBODIMENTS

Reference will now be made in detail to the exemplary embodiments of the present invention, examples of which are illustrated in the accompanying drawings, wherein like reference numerals refer to the like elements throughout.

Figure 1:
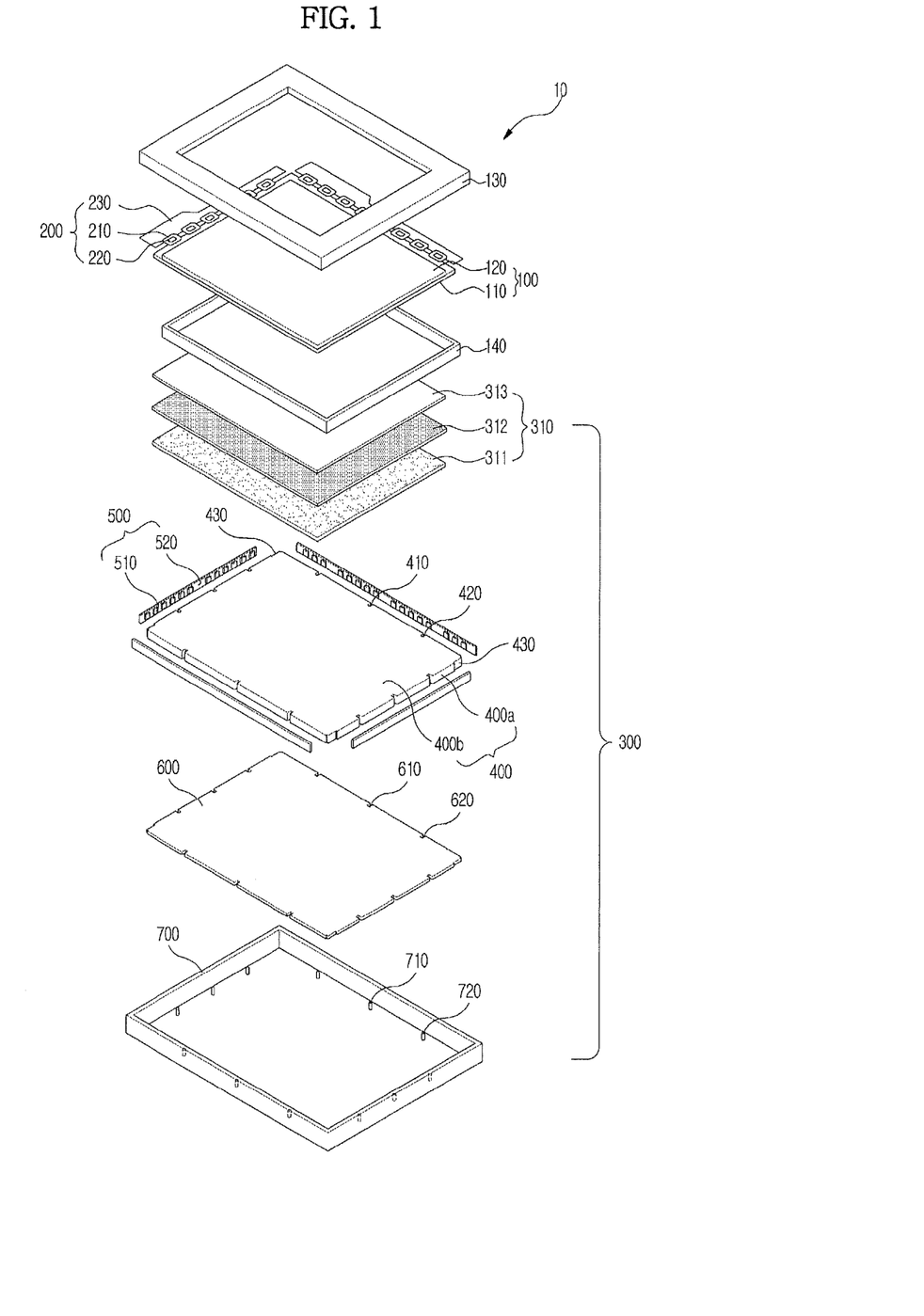
FIG. 1 is a perspective view of a liquid crystal display (LCD) according to an exemplary embodiment of the present invention.
Figure 2:
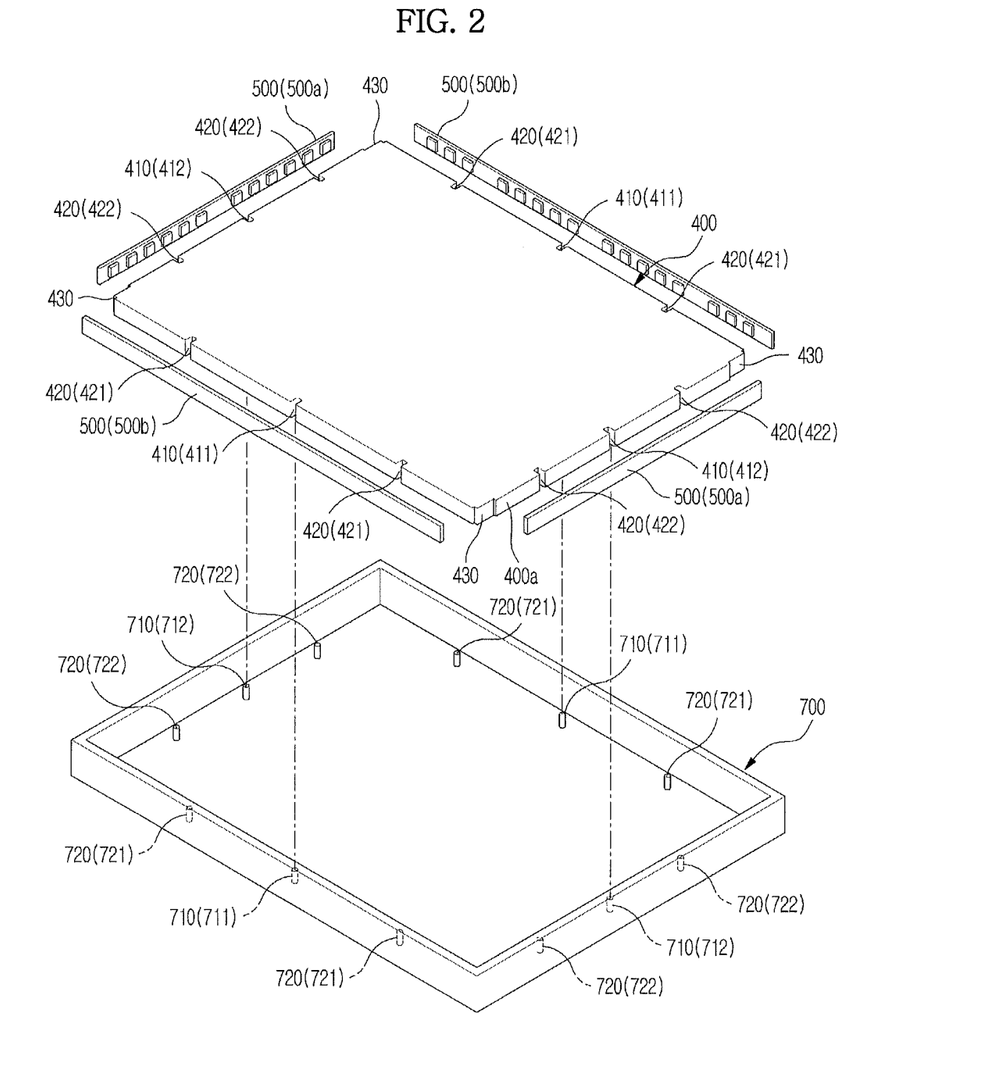
FIG. 2 is a perspective view showing a part of the LCD of FIG. 1.

FIG. 1 is a perspective view of a liquid crystal display (LCD) according to an exemplary embodiment of the present invention, and FIG. 2 is a perspective view showing a part of the LCD of FIG. 1.

As shown in FIG. 1 and FIG. 2, the LCD 10 according to the exemplary embodiment of the present invention comprises a liquid crystal panel 100 forming an image thereon, a driving unit 200 connected to one side of the liquid crystal panel 100 to drive the liquid crystal panel 100, and a backlight assembly 300 disposed at a lower side of the liquid crystal panel 100 to emit light to the liquid crystal panel 100.

A circumference of the liquid crystal panel 100 is supported by a molded frame 140. The molded frame 140 and the backlight assembly 300 are connected with an upper cover 130 that covers an upper side of the liquid crystal panel 100 with respect to the drawings.

The liquid crystal panel 100 comprises a thin film transistor (TFT) substrate 110, a color-filter substrate 120 attached to face the TFT substrate 110, and a liquid crystal (not shown) injected between the TFT substrate 110 and the color-filter substrate 120. The liquid crystal panel 100 adjusts optical transmittance of liquid crystal cells in accordance with image signal data being transmitted from the driving unit 200, thereby embodying images.

The driving unit 200 is disposed at one side of the TFT substrate 110 to apply driving signals to the liquid crystal panel 100. For this, the driving unit 200 comprises a flexible printed circuit board (PCB) 210, a driving chip 220 mounted to the flexible PCB 210, and a circuit board 230 connected to one side of the flexible PCB 210.

The backlight assembly 300 is disposed at the lower side of the liquid crystal panel 100. The backlight assembly 300 comprises optical sheets 310 diffusing and condensing light, being laminated on the lower side of the liquid crystal panel 100, a light guide panel 400 disposed at a lower side of the optical sheets 310, a light source unit 500 arranged along at least one lateral side of the light guide panel 400 to emit light toward the liquid crystal panel 100, a reflection sheet 600 disposed at a lower side of the light guide panel 400, and a lower cover 700 receiving and fixing the light guide panel 400.

More specifically, the optical sheets 310 are disposed parallel with the lower side of the liquid crystal panel 100, including a diffusion sheet 311, a prism sheet 312 and a protection sheet 313 which are layered in sequence. The diffusion sheet 311 comprises a base film (not shown) and a diffusion coating layer (not shown) disposed at an upper side of the base film, so as to diffuse the light emitted from the light source unit 500 and supply the diffused light to the liquid crystal panel 100.

The prism sheet 312 and the protection sheet 313 are disposed at an upper side of the diffusion sheet 311. The prism sheet 312 comprises trigonal prisms arranged at uniform intervals on the upper side thereof. The prism sheet 312 has light passed through the diffusion sheet 311 advanced straightly, thereby improving brightness of the light. The protection sheet 313 is formed on the prism sheet 312 to protect the diffusion sheet 311 and the prism sheet 312, which are susceptible to dust or scratches, from external impacts or entry of foreign substances such as dust.

The light guide panel 400 has a rectangular form having a predetermined thickness. The light guide panel 400 comprises an incident surface 400a disposed to face the light source unit 500 so that the light emitted from the light source unit 500 is incident thereto, an emissive surface 400b emitting the light being incident through the incident surface 400a, and a reflection surface (not shown) facing the emissive surface 400b.

The light guide panel 400 further comprises stepped parts 430 bordering the incident surface 400a and not facing the light source unit 500. Note that the terms "stepped part" and "stepped portion" are used interchangeably herein. That is, the stepped parts 430, where the light from the light source unit 500 is not directly incident, are disposed at lateral corners. Therefore, although light is emitted from two neighboring sides of the light source 500, overlapping of the lights at the corners of the light guide panel 400 may be minimized. Uniformities of brightness and temperature at the corners may be deteriorated when the lights are overlapped at the corners and the temperature at the corners may be increased.

According to an exemplary embodiment, the light guide panel 400 may be formed of polymethylmethacrylate (PMMA) having excellent transmittance and strength to be not easily broken or deformed.

Additionally, although not shown, a dedicated reflection sheet may be attached to any one side of the stepped part 430 where the light emitted from the light source unit 500 is not directly incident to the light guide panel 400, such that the light incident to the light guide panel 400 is prevented from leaking through the one side of the stepped part 430 or the leakage is minimized.

The light source unit 500 may be connected by screws to the lower cover 700 through the medium of a heat transmission member (not shown) to be arranged along the lateral sides including the incident surface 400a of the light guide panel 400. The light source unit 500 comprises a light emitting diode (LED) 510 and a circuit board 520 applying electric signals to the LED 510.

More specifically, a plurality of the light source units 500 are disposed to face at least two neighboring sides of the light guide panel 400. As used herein, "neighboring sides" are sides that adjoin at a corner of the light guide panel. For example, a plurality of the light source units 500 may be formed to face all of the four sides of the light guide panel 400, that is, arranged at both short sides facing each other and both long sides facing each other of the light guide panel 400. Here, the two light source units 500 arranged at the short sides will be referred to as first light source units 500a while the other two light source units 500 arranged at the long sides will be referred to as second light source units 500b.

The LED 510 may have a rectangular shape, mainly including, for example, Al having high thermal conductivity since the LED 510 would generate much heat. Each LED of a plurality of the LEDs 510 is arranged at a uniform interval on the circuit board 520. However, the plurality of LEDs 510 may be arranged at non-uniform intervals at parts corresponding to the lateral side structure of the light guide panel 400.

Each of the LEDs 510 may be implemented by a white light supplying unit including blue, red and green LEDs to supply white light. Alternatively, each of the LEDs 510 may be a white light supplying unit including a white LED.

The reflection sheet 600 reflects part of the light emitted from the light source units 500, leaking in a direction opposite to the liquid crystal panel 100, back to the light guide panel 400 to thereby reduce loss of light. The reflection sheet 600 may comprise polyethylene terephthalate (PET), polycarbonate (PC) and so forth. Although not shown in the drawings, corners of the reflection sheet 600 may be cut to have stepped areas corresponding to the positions of the stepped parts 430 of the light guide panel 400.

Also, a dedicated reflection sheet (not shown) may be attached to at least one surface of the stepped part 430 of the light guide panel 400.

In addition, the light guide panel 400, the light source units 500 and the reflection sheet 600 are received in the lower cover 700. As aforementioned, the lower cover 700 is connected to the molded frame 140 formed of an insulating synthetic resin.

The light guide panel 400 and the lower cover 700 may be connected and fixed to each other by forming cut parts 410 at the light guide panel 400 and supporting parts 710 at the lower cover 700. Reference symbols 610 and 620 denote cut parts formed at the reflection sheet 600 to achieve connection between the light guide panel 400 and the lower cover 700.

The lower cover 700 may be made of an aluminum alloy. Or, a thermal sheet coated with a graphite layer may be attached to the whole surface or a partial surface of the lower cover 700, such that the heat generated from the light source units 500 is emitted.

Figure 3:
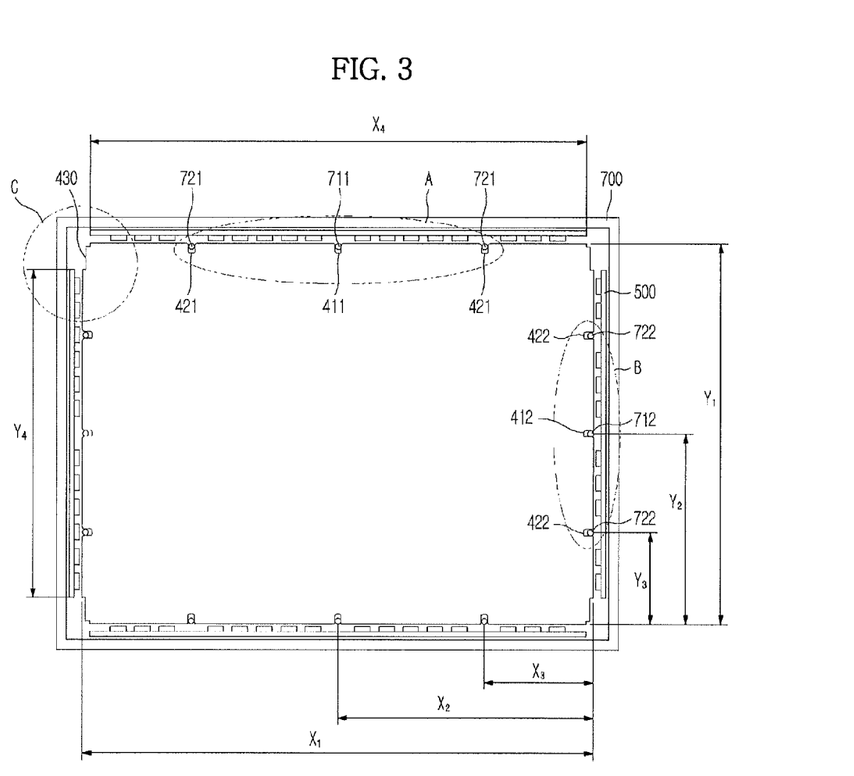
FIG. 3 is a plan view of a backlight assembly according to the exemplary embodiment of the present invention.
Figure 4A:
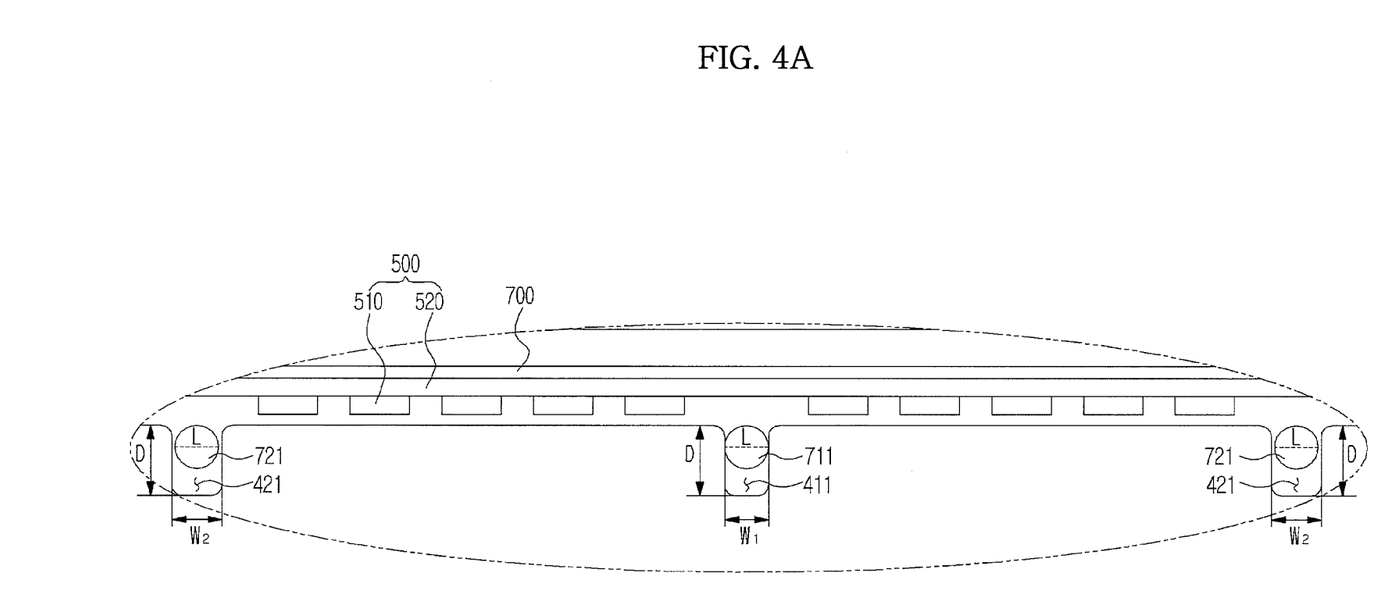
FIG. 4A is an enlarged view of a section A of FIG. 3.
Figure 4B:
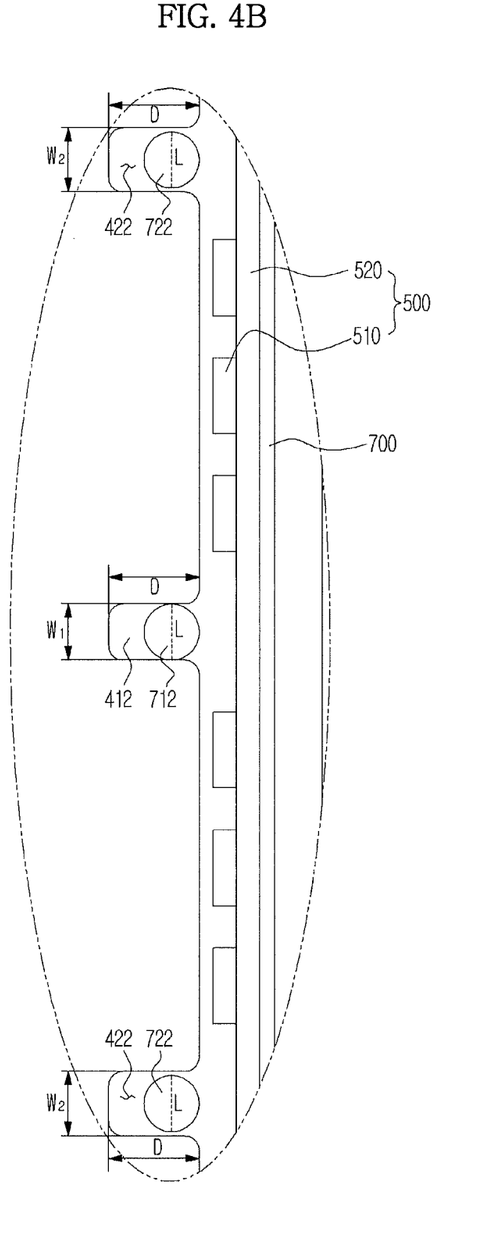
FIG. 4B is an enlarged view of a section B of FIG. 3.
Figure 4C:
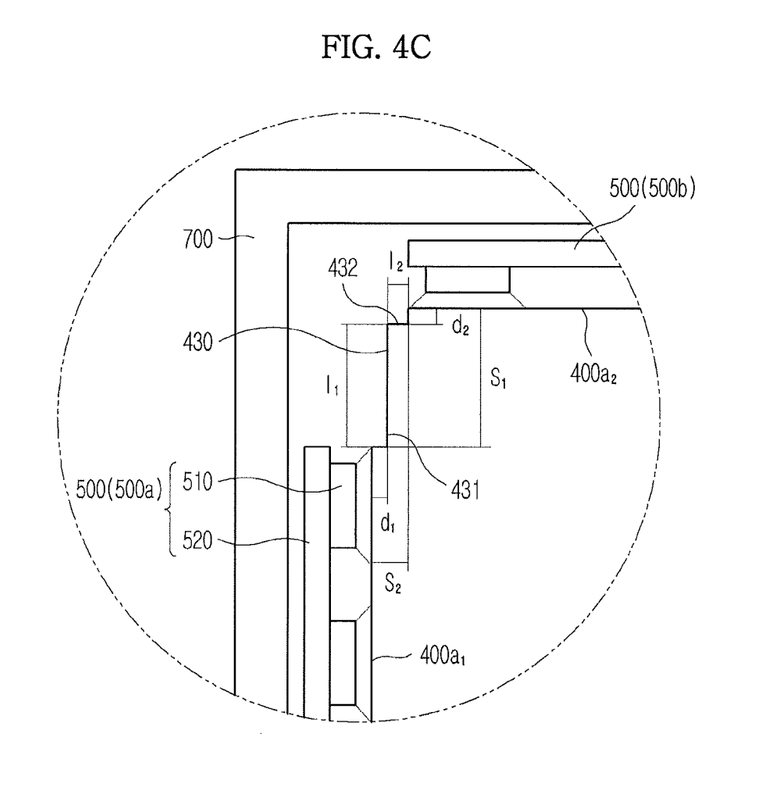
FIG. 4C is an enlarged view of a section C of FIG. 3.

FIG. 3 is a plan view of the backlight assembly according to the exemplary embodiment of the present invention. FIGS. 4A, 4B and 4C are enlarged views showing sections A, B and C, respectively.

As shown in FIG. 1 to FIG. 4, the lower cover 700 comprises the supporting parts 710 corresponding to the cut parts 410 of the light guide panel 400. The supporting parts 710 are protruded from a bottom surface of the lower cover 700 at positions corresponding to the cut parts 410 of the light guide panel 400. The supporting parts 710 may be integrally formed with the lower cover 700 by pressing or welding. Here, the supporting parts 710 formed at long sides of the lower cover 700 will be referred to as first supporting parts 711 while the other supporting parts 710 formed at short sides of the lower cover 700 will be referred to as second supporting parts 712.

First cut parts 411 are formed on the long sides disposed at upper and lower parts of the light guide panel 400. The first cut parts 411 may be formed by recessing the long sides of the light guide panel 400 by predetermined width $W_1$ and depth D to one side. More specifically, the first cut parts 411 may be disposed at positions corresponding to about a half length $X_2$ of the whole length $X_1$ of the long sides of the light guide panel 400, and fitted with the first supporting parts 711 formed at the long sides of the lower cover 700.

Each of the first supporting parts 711 has a cylinder form protruded by a predetermined height from the bottom surface of the lower cover 700. Diameter L of the first supporting part 711 is equivalent to the width $W_1$ of the first cut part 411 formed in an X-axis direction. Also, the diameter L of the first supporting part 711 is smaller than the depth D of the first cut part 411 formed in a Y-axis direction.

Accordingly, lateral movements, that is, the X-axis directional movements of the light guide panel 400 are prevented by the first supporting part 711. Therefore, while the light guide panel 400 is being fixed at a normal temperature, a uniform interval between the first light source units 500a may be maintained. Furthermore, even when the light guide panel 400 expands due to increase of the temperature by the first light source units 500a, since the lateral length of the light guide panel 400 with respect to the first light guide panel 711 is increased, the uniform interval between the first light source units 500a is still maintained.

According to an exemplary embodiment, the height of the first supporting part 711 is equivalent to the sum of the thicknesses of the reflection sheet 600 and the first cut part 411 of the light guide panel 400.

In addition, the second cut parts 412 are formed on the short sides disposed on the left and the right of the light guide panel 400. The second cut parts 412 may be disposed at positions corresponding to about a half length $Y_2$ of the whole length $Y_1$ of the short sides of the light guide panel 400, and fitted with the second supporting part 712 formed at the short side of the lower cover 700.

In the same manner as the first supporting part 711, the second supporting part 712 has a cylinder form protruded by a predetermined height from the bottom surface of the lower cover 700. Diameter L of the second supporting part 712 is smaller than the depth D of the second cut part 412 formed in the X-axis direction, and equivalent to the width $W_1$ of the second cut part 412 formed in the Y-axis direction.

Accordingly, vertical movements, that is, the Y-axis directional movements of the light guide panel 400 are prevented by the second supporting part 712, thereby maintaining a uniform interval between the second light source units 500b during fixing of the light guide panel 400 at a normal temperature. Furthermore, although the light guide panel 400 expands due to increase of the temperature by the second light source units 500b, the vertical length of the light guide panel 400 with respect to the second light guide panel 712 is increased so that the interval between the second light source units 500b is still maintained.

Exemplarily, the height of the second supporting part 712 is equivalent to the sum of the thicknesses of the reflection sheet 600 and the first cut part 411 of the light guide panel 400.

The first and the second cut parts 411 and 412 may be formed by applying a laser or a drill on the long sides and the short sides of the light guide panel 400. However, any other methods besides the laser or the drill may surely be used to process the first and the second cut parts 411 and 412.

The lower cover 700 may further comprise a sub-supporting part 720 corresponding to a sub-cut part 420 formed at the light guide panel 400. The sub-supporting part 720 is protruded from the bottom surface of the lower cover 700, at a position corresponding to the sub-cut part 420 of the light guide panel 400. Here, the sub-supporting parts 720 disposed at the long sides of the lower cover 700 are referred to as first sub-supporting parts 721 while the other sub-supporting parts 720 disposed at the short sides of the lower cover 700 are referred to as second sub-supporting parts 722.

First sub-cut parts 421 may be formed on the long sides of the light guide panel 400, in the form of a recess having predetermined width $W_2$ and depth D. The first sub-cut parts 421 are disposed at positions corresponding to a half length $X_3$ of the length $X_2$ of the first cut part 411 to be fitted with the first sub-supporting parts 721 formed at the long sides of the lower cover 700.

Diameter L of the first sub-supporting part 721 is smaller than the width $W_2$ of the first sub-cut part 421 formed in the X-axis direction, and also smaller than the depth D of the first sub-cut part 421 formed in the Y-axis direction. Therefore, although the light guide panel 400 expands due to increase of the temperature by the light source units 500, thereby causing lateral movements of the first sub-cut part 421, deformation of the first sub-supporting part 721 by the first sub-cut part 421 may be prevented.

Second sub-cut parts 422 may be formed on the short sides of the light guide panel 400, in the form of a recess having predetermined width $W_2$ and depth D. The second sub-cut parts 422 are disposed at positions corresponding to a half length $Y_3$ of the length $Y_2$ of the second cut part 412 to be fitted with the second sub-supporting parts 722 formed at the short sides of the lower cover 700.

Diameter L of the second sub-supporting part 722 is smaller than the depth D of the second sub-cut part 422 formed in the X-axis direction, and also smaller than the width $W_2$ of the second sub-cut part 422 formed in the Y-axis direction. Accordingly, although the light guide panel 400 expands as the temperature increases by the light source units 500, thereby causing lateral movements of the second sub-cut part 422, deformation of the second sub-supporting part 722 by the second sub-cut part 422 may be prevented.

In addition, as shown in FIG. 3 and FIG. 4C, the stepped parts 430 are inwardly formed at the lateral corners of the light guide panel 400. The stepped parts 430 may be formed by cutting predetermined portions of the long sides and the short sides at every corner of the light guide panel 400. Note that the stepped part might only include a single step, or even a single notch, in or near a corner of the light guide panel.

The stepped parts 430 are distinguished from the incident surface 400a facing the light source unit 500 and receiving the light from the light source unit 500. The stepped parts 430 are disposed so as not to face the light source unit 500. In other words, the stepped part 430 is part of the lateral sides of the light guide panel 400 where the light emitted from the light source unit 500 is not directly incident, and may be formed in a stepped manner covering two neighboring lateral sides.

In addition, although not shown, a dedicated reflection sheet may be attached to the stepped part 430 so as to prevent the light incident from the light source unit 500 to the incident surface 400a of the light guide panel 400 from leaking through the stepped part 430.

Comparing the whole lengths $X_4$ and $Y_4$ of the light source units 500 to the whole lengths $X_1$ and $Y_1$ of the light guide panel 400, the short side length $Y_1$ and the long side length $X_1$ of the light guide panel 400 are greater than the length $Y_4$ of the first light source unit 500a and the length $X_4$ of the second light source unit 500b, respectively. Accordingly, lengths $S_1$ and $S_2$ of the stepped part 430 are respectively corresponded to a difference between the length $Y_1$ of the short side of the light guide panel 400 and the length $Y_4$ of the first light source unit 500a and a difference between the length $X_1$ of the long side of the light guide panel 400 and the length $X_4$ of the second light source unit 500b.

The stepped part 430 comprises a first stepped part 431 formed at both corners of a first incident surface $400a_1$ to which light emitted from the first light source unit 500a is incident, and a second stepped part 432 formed at both corners of a second incident surface $400a_2$ to which light emitted from the second light source unit 500b is incident.

More particularly, the first stepped part 431 is formed by successively cutting out a predetermined portion of the first incident surface $400a_1$ disposed at the short slide of the light guide panel 400. The second stepped part 432 is formed by successively cutting out a predetermined portion of the second incident surface $400a_2$ disposed at the long side of the light guide panel 400. Here, cutting depths $d_1$ and $d_2$ into the light guide panel 400 and extended widths $I_1$ and $I_2$ of the first and the second stepped parts 431 and 432 may be determined in consideration of several factors including the positions of the light source units 500, the lengths $X_1$ and $Y_1$ of the short and long sides of the light guide panel 400, the lengths $Y_4$ and $X_4$ of the first and the second light source units 500a and 500b, and the rate of expansion of the light guide panel 400 according to the temperature.

Figure 5:
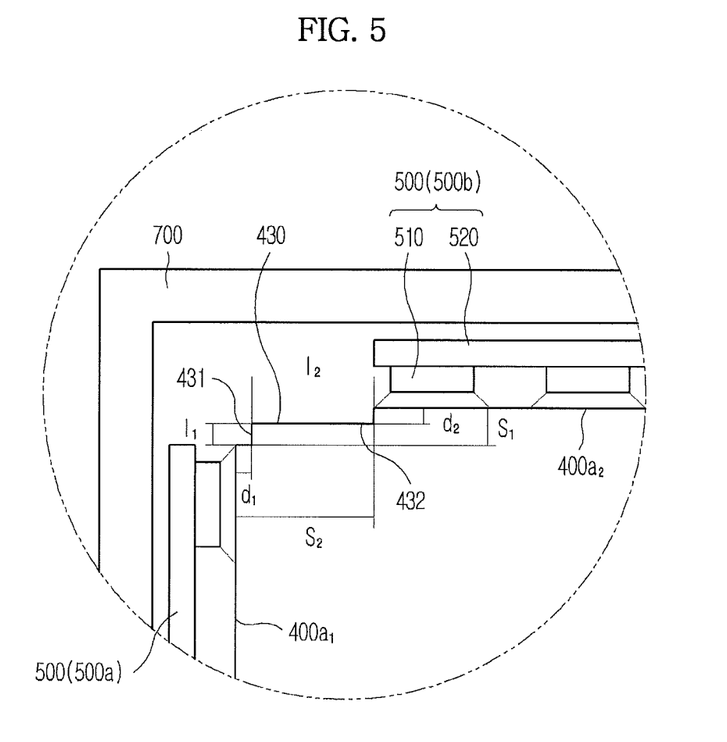
FIG. 5 shows a modified version of a stepped part according to the exemplary embodiment of the present invention.

The first and the second stepped parts 431 and 432 may have different cutting depths $d_1$ and $d_2$ and widths $I_1$ and $I_2$. As shown in FIG. 4C, the depth $d_1$ and the width $I_1$ of the first stepped part 431 formed at the short side of the light guide panel 400 may be relatively greater than the depth $d_2$ and the width $I_2$ of the second stepped part 432 formed at the long side of the light guide panel 400. Also, as shown in FIG. 5, the depth $d_1$ and the width of the first stepped part 431 may be relatively smaller than the depth $d_2$ and the width $I_2$ of the second stepped part 432.

Thus, either the depth $d_1$ and width $I_1$ of the first stepped part 431 or the depth $d_2$ and width $I_2$ of the second stepped part 432 may be formed greater than the other one. Here, the stepped part 431 or 432 having the greater depth and width has such a size that the lights emitted from the first and the second light source units 500a and 500b are not overlapped at the corners of the light guide panel 400.

Also, any one of the first and the second stepped part 431 and 432, for example, the second stepped part 432 may have relatively smaller depth $d_2$ and width $I_2$ than the depth $d_1$ and width of the first stepped part 431. Here, the relatively smaller depth $d_2$ and width $I_2$ may be determined in consideration of the rate of expansion of the light guide panel 400 according to the temperature. More specifically, the depth $d_2$ and width $I_2$ of the relatively smaller stepped part 432 are in the size to cover the thermal expansion of the light guide panel 400.

Figure 6:
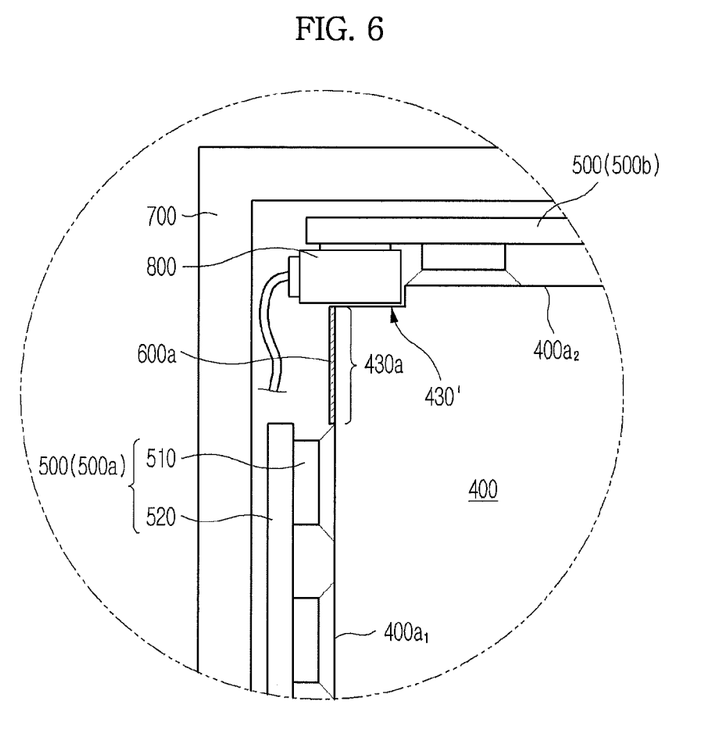
FIG. 6 is a view showing a stepped part according to another exemplary embodiment of the present invention.

FIG. 6 is a view showing a stepped part according to another exemplary embodiment of the present invention.

As shown in FIG. 6, the stepped part 430' according to another exemplary embodiment may be disposed at corners of the second incident surfaces $400a_2$ to which light emitted from the second light source units 500b formed at the long side of the light guide panel 400 is incident. However, according to the present exemplary embodiment, it is sufficient if the stepped parts 430' are formed at corners of any one of the first and the second incident surfaces $400a_1$ and $400a_2$ of the light guide panel 400.

Each of the stepped parts 430' is formed by cutting a predetermined portion of the second incident surface 400a formed at the long side of the light guide panel 400. As described above, the cutting depth and the extended width of the stepped part 430', by which the long side of the light guide panel 400 is cut inwardly, may be determined in consideration of several factors including the positions of the second light source units 500b, the length of the long side of the light guide panel 400, the length of the second light source unit 500b, and the rate of expansion of the light guide panel 400 according to the temperature.

A connector 800 in electric connection with the first and the second light source units 500a and 500b may be inserted in a space defined by the depth and the width of the stepped part 430'. Therefore, when intending to dispose the connector 800 between the second light source unit 500b and the light guide panel 400, the connector 800 may be disposed in the space defined by the stepped part 430' so that an interval between the plurality of LEDs 510 arranged on the circuit board 520 of the second light source unit 500b and the second incident surface $400a_2$ of the light guide panel 400 is minimized.

In addition, an optical sheet 600a is dedicatedly attached to a part 430a of the first incident surface, the part 430a where the light emitted from the first light source unit 500a is not directly incident, to thereby prevent or minimize leakage of the light from the inside to the outside of the light unit panel 400. The optical sheet 600a may further include a light reflection sheet (not shown). Although the stepped part 430' is formed on the second incident surface $400a_2$ and the optical sheet 600a is attached to the first incident surface $400a_1$ according to the drawing, the exemplary embodiment is not limited to such a configuration. For example, the stepped part 430' may be formed on the first incident surface $400a_1$ while the optical sheet 600 is attached to the second incident surface $400a_2$.

Figure 7:
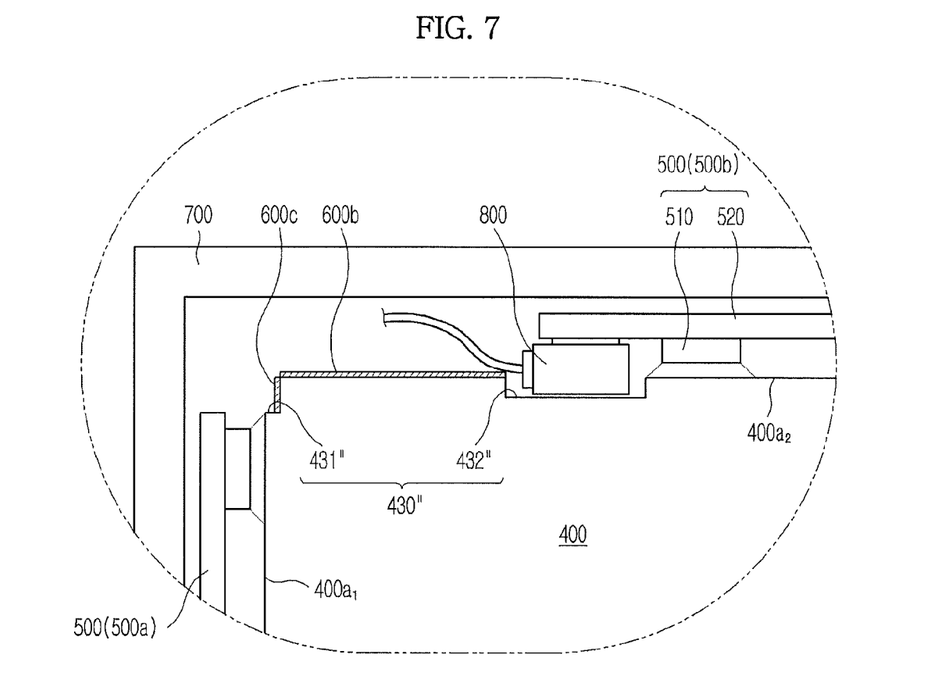
FIG. 7 shows a stepped part according to still another exemplary embodiment of the present invention.

FIG. 7 shows a stepped part according to still another exemplary embodiment of the present invention.

Referring to FIG. 7, the stepped part 430" according to the present exemplary embodiment includes a first stepped part 431" formed at corners of the first incident surface $400a_1$ to which the light emitted from the first light source unit 500a formed at the short side of the light guide panel 400 is incident, and a second stepped part 432" formed at non-corner parts, that is, positions other than the corners of the second incident surface 400a$_2$ to which the light emitted from the second light source unit 500b formed at the long side of the light guide panel 400 is incident. However, it is sufficient if the stepped part 430" of this exemplary embodiment is formed at the corners of any one of the first and the second incident surfaces 400a$_1$ and 400a$_2$ of the light guide panel 400 and at the non-corner parts of the other one of the incident surfaces 400a$_1$ and 400a$_2$.

The first stepped part 431" is formed by cutting a predetermined portion of the corner of the first incident surface 400a$_1$ formed at the short side of the light guide panel 400. The second stepped part 432" is formed by cutting a predetermined portion of the non-corner part of the second incident surface 400a$_2$ formed at the long side of the light guide panel 400.

A connector 800 electrically connected with the first and the second light source units 500a and 500b may be inserted in a space defined by the second stepped part 432" formed at the non-corner part of the short side of the light guide panel 400. Accordingly, an interval between the plurality of LEDs 510 arranged on the circuit board 520 of the second light source unit 500b and the second incident surface 400a$_2$ of the light guide panel 400 is minimized.

Furthermore, dedicated optical sheets 600b and 600c may be attached to a lateral surface of the first stepped part 431" and a surface disposed between the first and the second stepped parts 431" and 432", the surface where the light from the LEDs 510 of the light source unit 500 is not directly incident to the light guide panel 400, such that leakage of the light through the light guide panel 400 is prevented or minimized.

Figure 8:
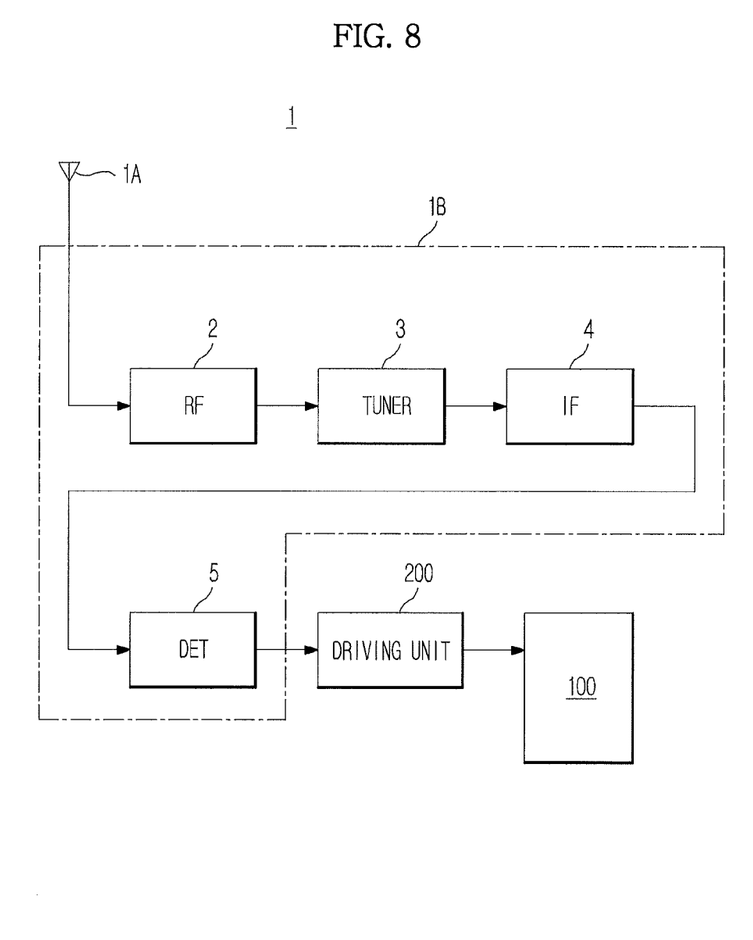
FIG. 8 is a view showing a structure of a TV receiver as a display device applying the LCD according to an exemplary embodiment of the present invention.
Figure 9:
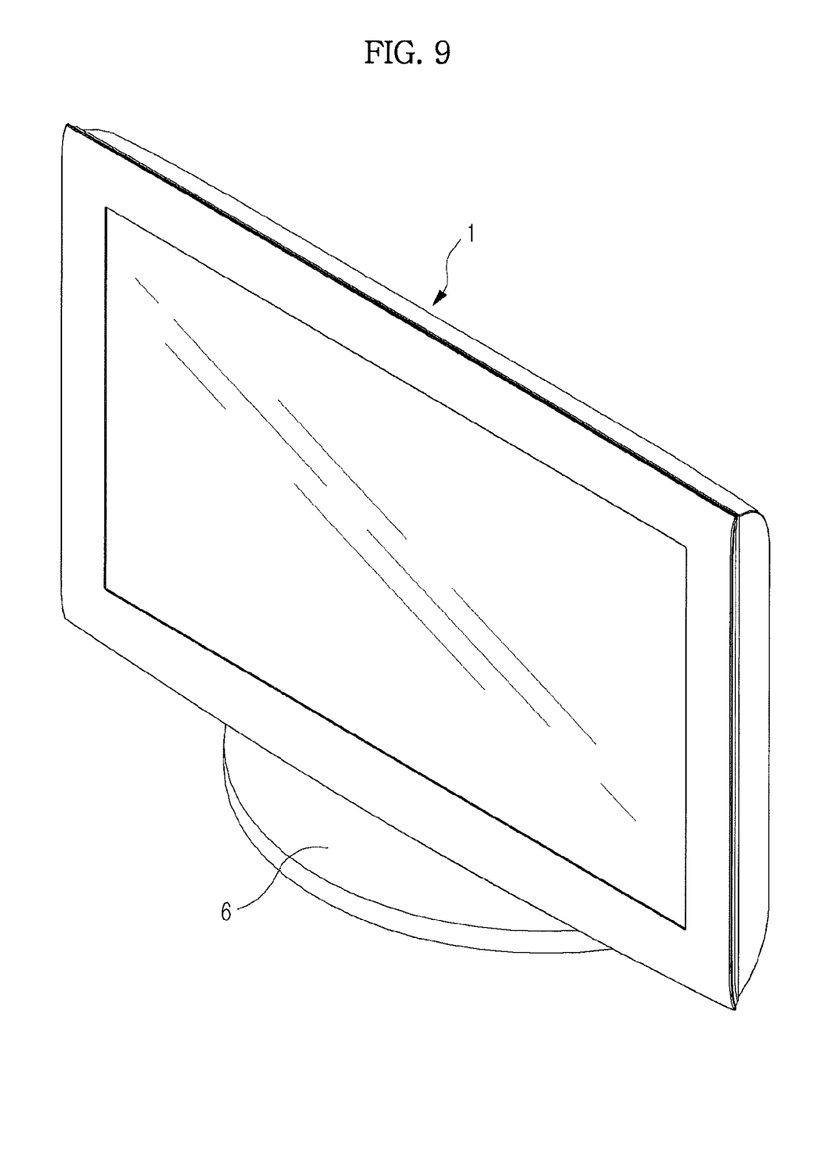
FIG. 9 is a view showing the exterior appearance of the TV receiver.

FIG. 8 is a view showing the structure of a TV receiver as a display device applying the LCD according to an exemplary embodiment of the present invention. FIG. 9 is a view showing the exterior appearance of the TV receiver.

As shown in FIGS. 8 and 9, the TV receiver 1 may include a high-frequency (HF) amplifier 2 connected to an antenna 1A to amplify HF signals including image signals such as a wireless signal, to serve as a signal processing unit 1B that processes image signals received from the outside, a tuner unit 3 converting the frequency of a desired channel of the HF signals and thereby forming a medium frequency (MF) signal, and an MF amplifier 4 amplifying the MF signals formed by the tuner 3 while removing signals of the other frequencies, and a detector 5 detecting the MD signals amplified by the MF amplifier 4 and forming image data. The signal processing unit 1B is connected to the driving unit 200 that transmits image signal information to the liquid crystal panel 100.

Although not shown, a switching mode power supply (SMPS) board may be installed at a rear side of the lower cover 700, the SMPS which is connected to the external AC power to supply power to a speaker that outputs audio signals, the signal processing unit 1B, other parts of the electric circuit, and the liquid crystal panel 100. The SMPS board may be installed at a stand 6 supporting the display device 1 according to an exemplary embodiment of the present invention.

As is apparent from the above description, a backlight assembly and an LCD having the same according to the exemplary embodiments of the present invention may be able to support a light guide panel being deformed by heat from a light source unit and minimize overlapping of lights emitted from the light source unit at corners of the light guide panel.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A display device comprising:
    a light guide panel including a corner having a stepped portion;
    a light source unit facing a lateral side of the light guide panel, the light source unit comprising a plurality of light emitted diodes (LEDs) arranged in a line, a printed circuit board on which the LEDs are disposed, and a connector provided at the printed circuit board to supply electricity to the printed circuit board;
    a lower cover to receive the light guide panel and the light source unit, the lower cover having at least one supporting part to support the light guide panel;
    a first reflection sheet disposed between the lower cover and the light guide panel to reflect light; and
    at least one second reflection sheet disposed at least one portion of another lateral side of the light guide panel which does not face the light source unit,
    wherein the connector is received in a space defined by the stepped portion, and
    wherein a plurality of stepped portions are disposed at least two corners of the light guide panel.

2. The display device according to claim 1, wherein the stepped portion has a depth and a width by which the one lateral side of the light guide panel is inwardly cut out.

3. The display device according to claim 1, wherein the light guide panel has two long lateral sides and two short lateral sides, and the stepped portion is formed one of the two long lateral sides.

4. The display device according to claim 1, wherein the light guide panel has four corners, and a plurality of stepped portions are disposed at the four corners of the light guide panel.

5. The display device according to claim 3, wherein the plurality of stepped portions comprise first stepped portions and second stepped portions,
    wherein the first stepped portions are cut inwardly by a first depth and a first width from the short sides of the light guide panel, and the second stepped portions are cut inwardly by a second depth and a second width from the long sides of the light guide panel and are connectively extended to the first stepped portions.

6. The display device according to claim 5, wherein one of the first and the second stepped portions has a greater width than the other.

7. The display device according to claim 5, wherein one of the first and the second stepped portions has smaller depth and width than the other, so as to cover deformation of the light guide panel caused by thermal expansion.

8. The display device according to claim 5 wherein the stepped portions are formed at corners of one of the long side and the short side.

9. The display device according to claim 5, wherein the stepped portions are formed at corners of one of the long side and the short side and at non-corner parts of the other one of the lateral sides of the light guide panel.

* * * * *